Oct. 23, 1934.                F. L. HAUSHALTER                1,978,019
                        PIPE COUPLING AND GASKET THEREFOR
                              Filed July 30, 1931
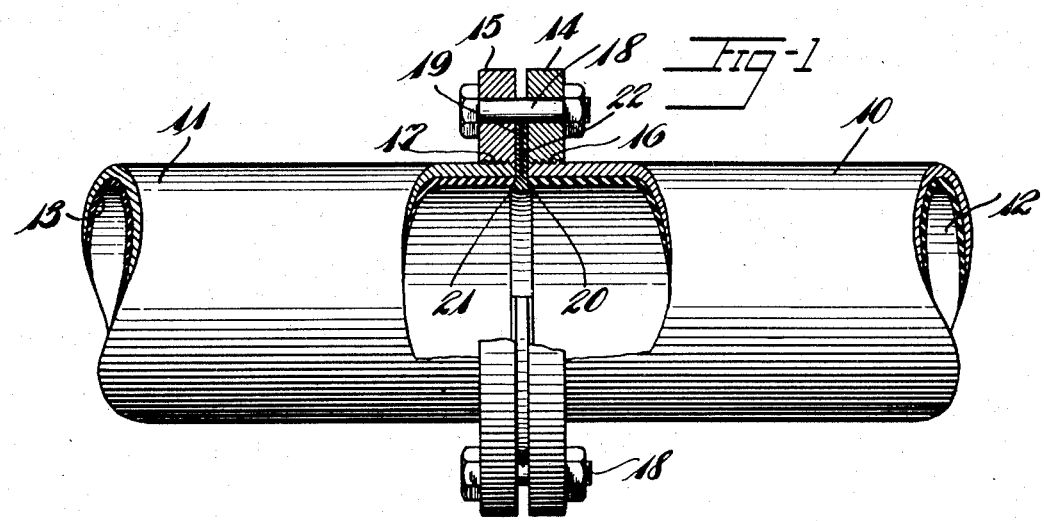
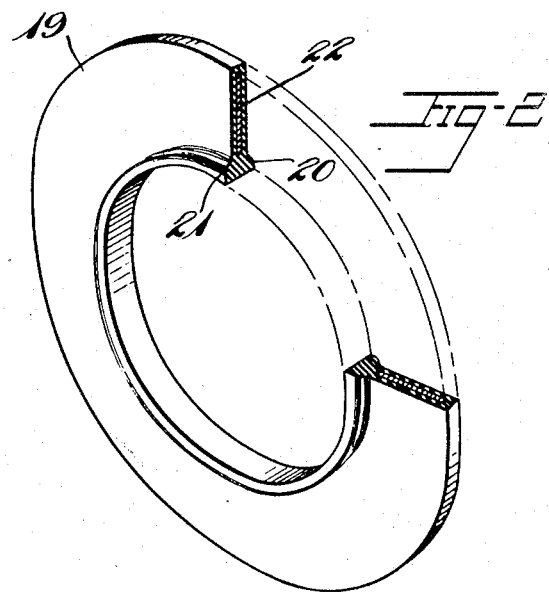
Inventor
Fred L. Haushalter
By Eakin & Avery
Attys.

Patented Oct. 23, 1934

1,978,019

UNITED STATES PATENT OFFICE 1,978,019

PIPE COUPLING AND GASKET THEREFOR

Fred L. Haushalter, Akron, Ohio, assignor to The B. F. Goodrich Company, New York, N. Y., a corporation of New York Application July 30, 1931, Serial No. 553,963

7 Claims. (Cl. 285—137)

This invention relates to pipe couplings and to gaskets therefor, and more particularly to couplings and gaskets for pipe sections lined with a corrosion resisting material such as rubber composition.

Due to the fact that it is often most convenient to cut pipe sections to length at the place of installation to suit the particular requirements, the joining of lined pipe sections has heretofore presented certain difficulties, especially in that it has usually been inconvenient and difficult at the place of installation to prepare the linings at the pipe ends suitably for effecting an efficient seal in the coupling.

Coupling constructions proposed heretofore for building at the scene of pipe installation have had the disadvantages that it has been difficult to avoid injuring or lessening the efficiency of the pipe lining in building the coupling, that in many cases the pipe passage has been objectionably constricted, and that the operation has entailed the use of special equipment and has consumed much time.

Among the chief objects of the invention are to provide for conveniently and effectively coupling the ends of lined pipe sections without requiring elaborate preparation of the pipe ends or lining, but with provision for an efficient seal, to provide a simplified and improved coupling construction, and to provide an improved gasket therefor.

These and further objects will be apparent from the following description, reference being made to the accompanying drawing in which:

Fig. 1 is a side view, partly broken away, showing two lined pipe sections joined by a preferred form of coupling made according to the invention.

Fig. 2 is a perspective view, partly broken away, of the gasket used in the coupling of Fig. 1.

Referring to the drawing, a pair of pipe sections 10 and 11 have linings 12 and 13 of corrosion resisting material, such as resilient rubber composition, which is preferably adhered to the pipe wall and terminates substantially flush with the pipe ends. Annular end flanges 14 and 15 are secured to the respective pipe sections in any suitable manner, such as by the screw threads 16, 17, and for drawing the pipe ends toward each other and for clamping them in place a plurality of longitudinally disposed bolts 18, 18 are mounted in circumferentially spaced apertures in the flanges.

Between the flanges and between the pipe ends and lining ends of the respective pipe sections is disposed an annular gasket 19 which is illustrated on a larger scale in Fig. 2. This gasket comprises a body portion of a thickness which is substantially uniform over its radial depth, except that it is outwardly flared at its inner periphery to provide annular beads 20 and 21, preferably formed with their shouldered surfaces diverging in a radially inward direction and slightly rounded as shown. The gasket may be of any suitable material, which especially at the inner periphery of the gasket is preferably of resilient corrosion-resisting rubber composition, and the body of the gasket is preferably provided with a reinforcement 22 of suitably rigid material such as metal or fiber.

The gasket is of such annular shape that it is adapted to fit in the coupling with its flat faces lying against the pipe ends and, desirably, also against the faces of the flanges 14 and 15 which may be disposed with their faces flush with the pipe ends. The shoulders of the beads 20, 21 of the gasket abut the ends of the pipe linings as shown in Fig. 1, and the arrangement is such that when the flange bolts are drawn up the resilient rubber of the shouldered portion of the gasket and the rubber of the end portion of the respective linings will be held under sealing compression against each other. Displacement of the rubber of the end portions of the linings is resisted by the cumulative stiffness of the rubber back of it, assisted by the adhesion of the lining to the pipe, and good sealing compression of the rubber is obtained without undesirable displacement thereof.

The tapered form of the shoulders contributes to the maintenance of an efficient seal by causing the lining rubber to be crowded radially between the shoulders and the rigid pipe wall despite the axial direction of the clamping pressure, and this effect is enhanced by the fact that radially inward displacement of the rubber of the shouldered portion of the gasket is resisted by the rigid reinforcing ring 22 imbedded in the body of the gasket.

A substantially smooth interior surface of the pipe lining is presented in the region of the joint and there is but little constriction of the passage. The gasket is preferably of such outer diameter that it engages the shanks of the flange bolts, as shown in Fig. 1, which arrangement facilitates proper alignment of the gasket in the coupling.

It will be seen that elaborate treatment of the pipe linings is unnecessary with a coupling constructed according to the invention, it being necessary for obtaining a high quality joint merely to provide pipe sections having their ends cut squarely across and evenly around their circumferences, preferably with the linings terminating substantially flush with the ends of the pipes. This simple preparation of the pipe ends, and assembly of the coupling may be conveniently accomplished at the place of pipe installation and subsequent repairs or replacements as well as initial installation operations, are greatly facilitated.

Variations may be made without departing from the scope of the invention as it is defined in the following claims.

What is claimed is:

1. A coupling assembly comprising a pair of pipe sections having linings of yieldable material, a gasket disposed between said sections and having axially-projecting beveled portions adapted by axial pressure of them against the linings to press the adjacent portions of the latter radially against the pipe sections, and means for clamping the pipe sections to hold the beveled portions of the gasket thus pressed against the linings.

2. A coupling asembly as defined in claim 1 in which the gasket comprises a portion extending radially outward from the beveled portions of the gasket and held by the clamping means to resist radially inward movement of the beveled portions of the gasket.

3. A coupling assembly comprising a pair of pipe sections having linings of resilient rubber adhered to the pipe sections and terminating substantially flush with the ends of the pipe sections, a gasket having axially-projecting beveled portions adapted by axial pressure of them against the end surfaces of the linings to press the adjacent portions of the linings radially against the pipe sections, and means for clamping the pipe sections to hold the beveled portions of the gasket thus pressed against the linings, said gasket having also a portion extending radially outward from the beveled portions thereof and held by the clamping means to resist radially inward movement of the beveled portions.

4. A coupling assembly comprising a pair of lined conduit sections, a sealing member in sealing relation with the lining of one of the sections and having a substantially frusto-conical sealing face engaging the lining of the second section, said frusto-conical face sloping away from the first conduit section and toward the conduit axis and being substantially co-extensive with the radial thickness of the lining of the second conduit section, and means for clamping the sections with the said sealing face held pressed against the lining of the second conduit section.

5. A coupling assembly as defined in claim 4 in which the lining of the said second conduit section is of resilient rubber and terminates substantially flush with the end of the conduit section, and the frusto-conical face of the sealing member engages the end surface of the rubber lining.

6. A coupling assembly as defined in claim 4 in which the frusto-conical face of the sealing member comprises resilient rubber composition.

7. A coupling assembly comprising a pair of lined conduit sections, a sealing member in sealing relation with the lining of one of the sections and having a radially extending clamping face terminating at its radially inner margin in a beveled sealing face projecting axially from the clamping face and being substantially co-extensive with the radial thickness of the lining of the second conduit section, and means associated with the clamping face for clamping the conduit sections to hold the beveled face of the sealing member pressed against the lining of the second conduit section.

FRED L. HAUSHALTER.